US010300646B2

(12) United States Patent
Nishimura

(10) Patent No.: US 10,300,646 B2
(45) Date of Patent: May 28, 2019

(54) PARTING LOCKING DEVICE AND INJECTION MOLDING MOLD ASSEMBLY USING SAME

(71) Applicant: AIYUKI GIKEN CO., LTD., Osaka (JP)

(72) Inventor: Masatoshi Nishimura, Osaka (JP)

(73) Assignee: Aiyuki Giken Co., Ltd., Osaka (JP)

( * ) Notice: Subject to any disclaimer, the term of this patent is extended or adjusted under 35 U.S.C. 154(b) by 0 days.

(21) Appl. No.: 15/755,845

(22) PCT Filed: Sep. 2, 2015

(86) PCT No.: PCT/JP2015/074956
§ 371 (c)(1),
(2) Date: Feb. 27, 2018

(87) PCT Pub. No.: WO2017/037893
PCT Pub. Date: Mar. 9, 2017

(65) Prior Publication Data
US 2018/0326637 A1    Nov. 15, 2018

(51) Int. Cl.
*B29C 45/64* (2006.01)
*B29C 45/26* (2006.01)
(Continued)

(52) U.S. Cl.
CPC ......... *B29C 45/641* (2013.01); *B29C 33/20* (2013.01); *B29C 33/26* (2013.01);
(Continued)

(58) Field of Classification Search
CPC ............ B29C 45/641; B29C 45/2602; B29C 2045/642; B29C 33/22
See application file for complete search history.

(56) References Cited

U.S. PATENT DOCUMENTS 3,724,802 A * 4/1973 Veneria ............... B29C 45/2602
249/67
4,403,810 A * 9/1983 Bieneck ............... B29C 33/202
425/589
(Continued)

FOREIGN PATENT DOCUMENTS

JP     06-722     1/1994
JP     10-623     1/1998
(Continued)

OTHER PUBLICATIONS

International Preliminary Report on Patentability dated Mar. 6, 2018 in International (PCT) Application No. PCT/JP2015/074956.
(Continued)

*Primary Examiner* — James P Mackey
(74) *Attorney, Agent, or Firm* — Wenderoth, Lind & Ponack, L.L.P.

(57) ABSTRACT

The present invention provides a parting locking device configured such that a locking member can be uncoupled from a base holder even with a locking bar inserted in the locking member, and the locking bar stably moves. The locking bar includes a thick-walled and thin-walled portions. In a first state in which the thick-walled portion is located between an engagement element and the inner surface of a bar inserting hole, and in a third state in which the locking bar is pulled out of the locking member, the engagement element is moved to first or second engagement element paths, and the locking member is uncoupled from the base holder. In a second state in which the thin-walled portion is located between the engagement element and the inner surface of the bar inserting hole (9), the engagement element is engaged with engagement recesses, thereby keeping the locking member coupled to the base holder.

8 Claims, 6 Drawing Sheets

(51) Int. Cl.
*B29C 33/26* (2006.01)
*B29C 33/20* (2006.01)
*B29C 45/66* (2006.01)

(52) U.S. Cl.
CPC .......... *B29C 45/2602* (2013.01); *B29C 45/64* (2013.01); *B29C 2045/2604* (2013.01); *B29C 2045/642* (2013.01); *B29C 2045/667* (2013.01)

(56) References Cited

U.S. PATENT DOCUMENTS 4,828,478 A * 5/1989 Hehl .................. B29C 45/1756
425/190
2012/0100239 A1 4/2012 Li et al.

FOREIGN PATENT DOCUMENTS

| JP | 10-323744 | 12/1998 |
|----|-----------|---------|
| JP | 2004-74591 | 3/2004 |
| JP | 3761690 | 3/2006 |
| JP | 2008-119953 | 5/2008 |

OTHER PUBLICATIONS

International Search Report dated Nov. 24, 2015 in International (PCT) Application No. PCT/JP2015/074956.

* cited by examiner

PARTING LOCKING DEVICE AND INJECTION MOLDING MOLD ASSEMBLY USING SAME

TECHNICAL FIELD

The present invention relates to a parting locking device, and an injection molding mold assembly which is used in an injection molding machine so as to mold resin, and in which parting locking devices are used.

BACKGROUND ART

Parting locking devices are mainly used in three-plate type injection molding machines.

A three-plate type injection molding machine includes a fixed mold and a movable mold defining, between the fixed and movable molds, a cavity for molding resin into a predetermined shape, and a stripper plate configured to be brought into contact with and separated from the movable mold. Two parting locking devices are used in a three-plate type injection molding machine to separate, when opening the cavities, the stripper plate from the movable mold before separating the movable mold from the fixed mold.

The distal end of a spool bush of this injection molding machine is inserted into the stripper plate so that molten resin supplied through the inserted spool bush is guided to a gate provided in the movable mold, and is injected into the cavity.

Thereafter, the stripper plate is separated from the movable mold before the movable mold is separated from the fixed mold so that a runner portion formed between the stripper plate and the movable mold is separated from the product made of the resin injected into the cavity.

Thereafter, the movable mold is separated from the fixed mold, and the now-hardened product in the cavity is taken out of the fixed mold.

By moving/separating the stripper plate from the movable mold before separating the movable mold from the fixed mold, it is possible to prevent the deformation of the product.

The above method requires that the movable mold be coupled to the fixed mold (the separation of the parting surfaces be prevented) until the stripper plate is moved to a predetermined position, and the runner portion is separated from the product. In order to satisfy this requirement, parting locking devices are used.

Conventional parting locking devices are disclosed or illustrated, for example, in Japanese Patent (JP) 3761690 and Japanese Unexamined Patent Application Publication (JP) 2008-119953, and FIG. 10 of the present application.

The parting locking device of FIG. 10 is disclosed as prior art in JP 3761690, and includes a locking bar 51 mounted to a stripper plate 35.

The locking bar 51 is inserted between a base holder 55 and an engagement claw 53 pivotable about a support pin 52, thereby keeping the engagement claw 53 in engagement with a locking claw 54

When the locking bar 51 is pulled out of the base holder 55, the engagement claw 53 is disengaged from the locking claw 54, and a locking member 56 is uncoupled from the base holder 55, so that a movable mold 34 can be separated from a fixed mold 32.

The parting locking device of the invention of JP 3761690 differs from this prior art in that the locking member includes an insertion portion capable of being inserted into and pulled out of the base holder.

Engagement elements retained on the respective sides of the insertion portion are pushed toward the outside of the insertion portion by the locking bar such that the portions of the engagement elements protruding beyond the insertion portion are engaged in engagement recesses provided in the base holder.

This engagement state is maintained by the locking bar being inserted in a hole of the insertion portion. As a result thereof, it is possible to maintain the coupled state of the base holder and the locking member, which are mounted to the fixed mold and the movable mold, respectively, and thus to prevent the movable mold from being separated from the fixed mold.

PATENT DOCUMENTS

Patent document 1: Japanese Patent No. 3761690
Patent document 2: Japanese Unexamined Patent Application Publication No. 2008-119953

SUMMARY OF THE INVENTION

In the parting locking device of FIG. 10, when the stripper plate 35 moves upwardly, and an upwardly pulling force is applied to the movable mold 34, the claw portion 54 is strongly pushed against the engagement claw 53, so that the engagement claw 53 might be unable to move to an unlocking point, thereby making it difficult to unlock/uncouple the locking member 56.

Also, since the locking bar 51 needs to be pulled out of the base holder 55 so as to disengage the engagement claw 53 from the locking claw 54, the movement stroke of the locking bar 51 (i.e., the movement stroke of the stripper plate 35) necessary for disengaging the engagement claw 53 is large. As a result thereof, the injection molding machine is less likely to operate in a prompt manner.

Also, when the locking bar 51 pushes the engagement claw 53 to move the engagement claw 53 to the engagement point at which the engagement clay 53 is engaged with the locking claw 54, a pushing and bending force is applied to the support pin 52, so that the support pin 52 might be bent, thereby making it difficult for the engagement claw 53 to move in a smooth manner. Under such a situation, it is difficult for the engagement claw 53 to be engaged with and disengaged from the locking claw 54 in a stable manner.

On the other hand, since the parting locking device of the invention of JP 3761690 is configured such that, when the locking bar moves away from the engagement elements, the movable mold can be separated from the fixed mold, it is not necessary to completely pull the locking bar out of the locking member so as to separate the movable mold from the fixed mold.

However, in the parting locking device of the invention of JP 3761690, the below-described problem tends to occur. Namely, since the upwardly pulling force applied to the movable mold from the stripper plate (stripper template) tends to cause the movable mold to be separated from the fixed mold, and further causes the engagement elements to be dragged by the locking bar, due to the influence of the inclined surfaces of the engagement recesses, the engagement elements, which are round pins, are strongly sandwiched between the locking bar and the respective inclined surfaces of the engagement recesses, so that it is difficult to move the locking bar, and thus to disengage the engagement elements, i.e., to separate the movable mold from the fixed mold.

It is an object of the present invention to provide a parting locking device for an injection molding mold assembly which allows the base holder and the locking member to be uncoupled from each other even while the locking bar is inserted in the locking member, and which ensures stable movement of the locking bar.

SUMMARY OF THE INVENTION

In order to achieve the above object, the present invention provides a parting locking device comprising: a base holder; a locking member including a bar inserting hole vertically extending through the locking member; and a locking bar capable of being inserted into and pulled out of the bar inserting hole, wherein the base holder comprises: a vertically penetrating portion having two side surfaces; engagement ribs provided on the two side surfaces of the vertically penetrating portion so as to be opposed to each other, and including engagement recesses provided in respective longitudinal midway portions of the engagement ribs so as to be opposed to each other; and first engagement element paths and second engagement element paths provided such that the engagement ribs are located between the first engagement element paths and the respective second engagement element paths, wherein the locking member comprises: an insertion portion capable of being inserted into and pulled out of the vertically penetrating portion of the base holder; an engagement element having two ends, and mounted to the bar inserting hole such that the engagement element is movable in a thickness direction of the locking bar, and such that the two ends of the engagement element protrude out of the insertion portion so as to be engageable in the respective engagement recesses; and a spring configured to bias the engagement element, wherein the locking bar comprises a thick-walled portion and a thin-walled portion that are arranged in a longitudinal direction of the locking bar, wherein the parting locking device is capable of creating: a first state in which the thick-walled portion is located between the engagement element and an inner surface of the bar inserting hole; a second state in which the thin-walled portion is located between the engagement element and the inner surface of the bar inserting hole; and a third state in which the locking bar is pulled out of the locking member, wherein the first state, the second state, and the third state are capable of being selectively switched according to how much the locking bar is inserted in the bar inserting hole, wherein in the second state, the engagement element is pushed by the spring, and moved to an engaged position in which the engagement element is engaged in the engagement recesses, thereby keeping the locking member coupled to the base holder, wherein in the first state, the engagement element is moved into the first engagement element paths while compressing the spring, thereby uncoupling the locking member from the base holder, and wherein in the third state, the engagement element is pushed by the spring, and moved into the second engagement element paths, thereby uncoupling the locking member from the base holder.

It is preferable that the locking bar further comprises cam surfaces provided, respectively, at front and rear ends of the thick-walled portion so as to push and move the engagement element in the thickness direction of the locking bar. The rear end of the thick-walled portion is connected to the thin-walled portion through one of the cam surfaces. The cam surfaces at the front and rear ends of the thick-walled portion slope in opposite directions to each other.

It is preferable that the engagement element comprises cam surfaces provided, respectively, on upper and lower end corners of one surface of the engagement element in a thickness direction of the engagement element such that, when each of the cam surfaces of the engagement element is pushed by the locking bar, a component force in the thickness direction of the locking bar is generated by contact of one of the cam surfaces of the locking bar with the cam surface of the engagement element.

It is preferable that the locking member further comprises a guide shaft, and the spring comprises a coil spring mounted around an outer periphery of the guide shaft.

The above-described parting locking device is mounted to an injection molding machine including movable and fixed molds such that one of the base holder and the locking member is fixed to the movable mold, and the other of the base holder and the locking member is fixed to the fixed mold. Also, the above-described parting lock is mounted to a three-plate type injection molding machine including a stripper plate such that the locking bar is fixed to the stripper plate.

The present invention also provides an injection molding mold assembly used in an injection molding machine, the injection molding mold having two sides to each of which the parting locking device is mounted.

Effects of the Invention

The parting locking device of the present invention is configured such that the locking member can be uncoupled from the base holder not only when the locking bar is pulled out of the locking member but also when the thick-walled portion of the locking bar is still between the engagement element and the inner surface of the bar inserting hole. Therefore, the movement stroke of the locking bar necessary for uncoupling the locking member is small, and thus the injection molding mold can operate in a prompt manner.

Also, since the engagement element moves in the thickness direction of the locking bar (direction orthogonal to the direction in which the locking bar is inserted into the locking member), the engagement element is never dragged by the locking bar, so that the locking bar can move in a smooth manner, and thus the locking member can be uncoupled from the base holder in a stable manner.

Also, since two engagement protrusions opposed to each other are provided in the vertically penetrating portion of the base holder such that holding forces are applied in a balanced manner to the insertion portion of the locking member inserted in the vertically penetrating portion of the base holder, the insertion portion is held in a balanced manner, and thus is never caught on the inner surface of the vertically penetrating portion. As a result thereof, the insertion portion can be pulled out of the vertically penetrating portion in a smooth manner.

In the injection molding mold assembly in which such parting locking devices are used, the movable mold can be separated from the fixed mold with no problem.

Since the parting locking device is configured such that the locking bar includes cam surfaces provided, respectively, at the front and rear ends of the thick-walled portion, or the engagement element includes cam surfaces provided, respectively, on the upper and lower corners of one surface of the engagement element, the locking bar can be smoothly inserted into and pulled out of the locking member, thereby making it possible to smoothly move the engagement element to predetermined positions.

If a coil spring mounted on the outer periphery of the guide shaft biases the engagement element, the position of the coil spring is retained in a stable manner, so that the engagement element can be moved to predetermined positions in a stable manner. Furthermore, even if the coil spring breaks, the guide shaft can prevent the broken portions of the coil spring from dispersing.

DETAILED DESCRIPTION OF THE INVENTION

Embodiments of a parting locking device and an injection molding mold assembly using such parting locking devices are now described with reference to FIGS. 1 to 9 of the attached drawings.

Figure 1:
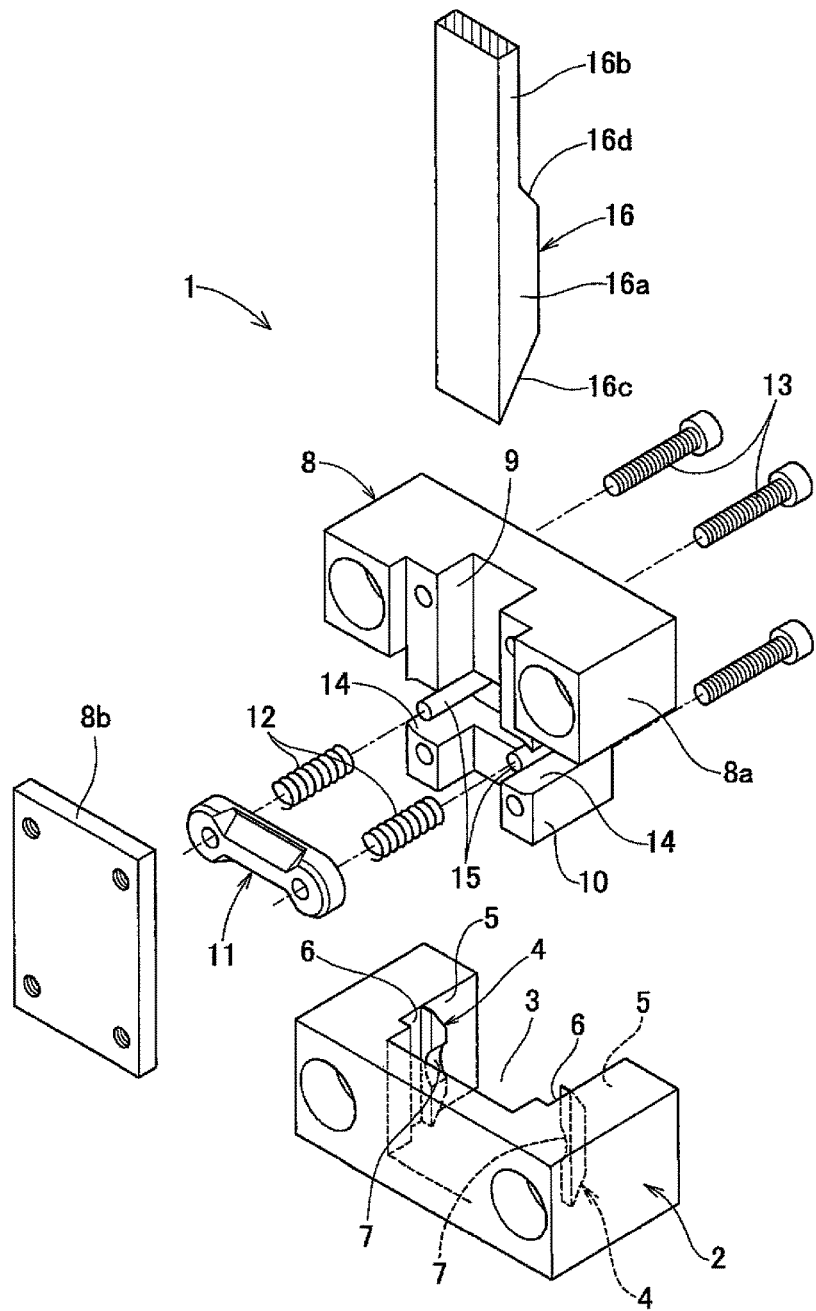
FIG. 1 is an exploded perspective view of a parting locking device embodying the present invention.
Figure 2:
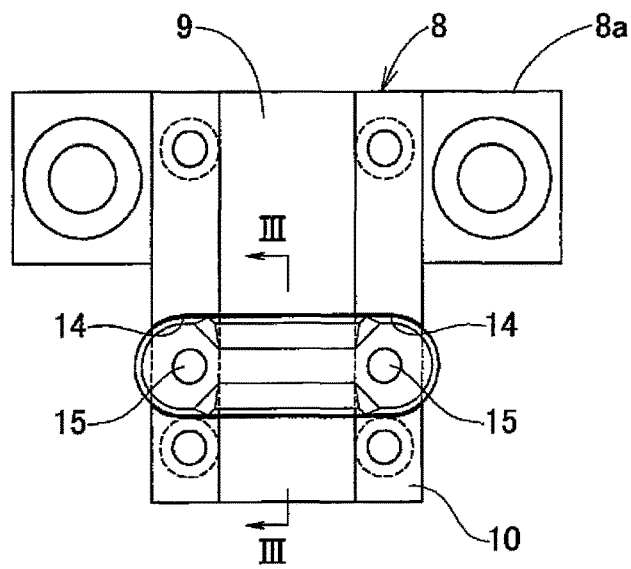
FIG. 2 is a front view of a locking member included in the parting locking device of FIG. 1 with a cover plate removed from the locking member.

As illustrated in FIG. 1, the parting locking device 1 of the present invention includes a base holder 2, a locking member 8, and a locking bar 16 capable of being inserted into and pulled out of the locking member 8.

The base holder 2 includes a vertically penetrating portion 3 vertically extending through the base holder 2 (see FIGS. 1, 4, and 5 to 8); two engagement ribs 4 provided in the vertically penetrating portion 3 (see FIGS. 1, 4, 5, 7 and 8); and first engagement element paths 5 and second engagement element paths 6 provided such that the two engagement protrusions 4 are located between the first engagement element paths 5 and the respective second engagement element paths 6 (see FIGS. 1, and 4 to 8).

Figure 4:
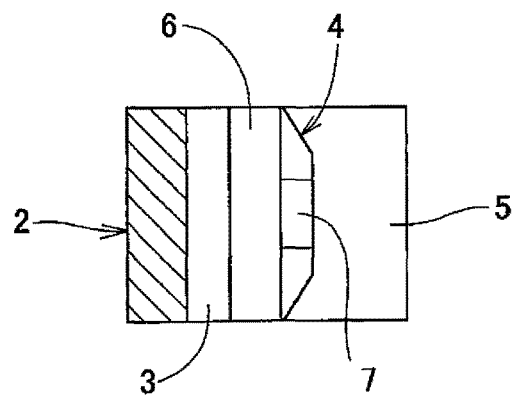
FIG. 4 is a view illustrating a side surface of a vertically penetrating portion which is provided in a base holder, and in which engagement protrusions are provided.
Figure 7:
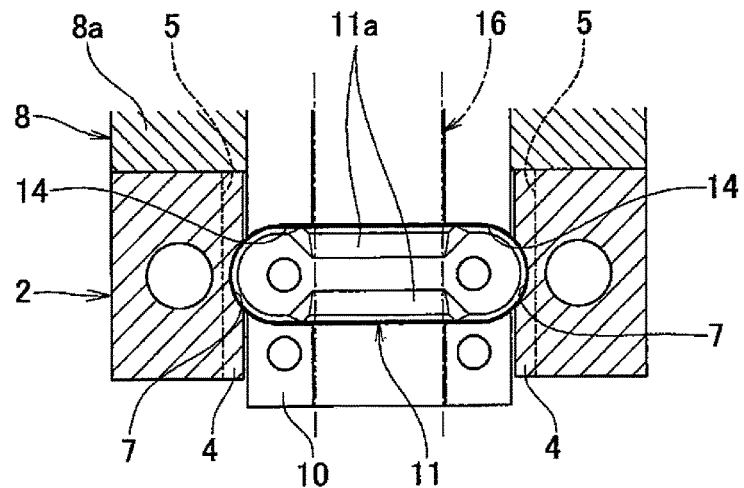
FIG. 7 is a sectional view taken along line VII-VII of FIG. 6, the sectional view illustrating the second state, in which the engagement element is engaged in engagement recesses provided in the respective engagement protrusions.
Figure 8:
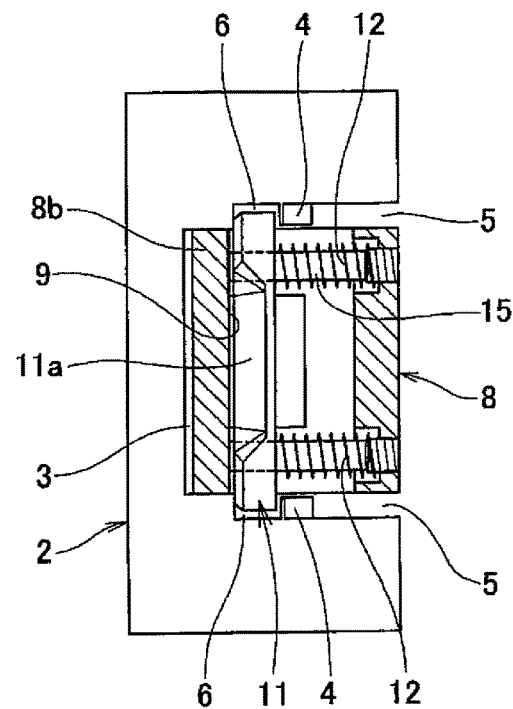
FIG. 8 is a sectional view illustrating a third state in which the locking bar is pulled out of the bar inserting hole from the position where the locking bar is located between the engagement element and the inner surface of the bar inserting hole.

The two engagement ribs 4 are elongated in the vertical direction, and provided on two side surfaces of the vertically penetrating portion 3 so as to be opposed to each other. As illustrated in FIGS. 1, 4 and 7, engagement recesses 7 are provided in the respective longitudinal midway portions of the two engagement protrusions 4 so as to be opposed to each other.

Each of the first engagement element paths 5 and the second engagement element paths 6 extends through the base holder 2 and opens to the top and bottom surfaces of the base holder 2.

The locking member 8 includes a bar inserting hole 9 vertically extending through the locking member 8 (see FIGS. 1, 2, 5, 6 and 8); an insertion portion 10 (see FIGS. 1 and 2) integral with the main body 8a of the locking member 8, and capable of being inserted into and pulled out of the vertically penetrating portion 3 of the base holder 2; an engagement element 11 mounted to the insertion portion 10; and springs 12 biasing the engagement element 11. The bar inserting hole 9 is located between the two sides of the insertion portion 10.

The insertion portion 10 is provided with a cutout groove 14 extending to cross the bar inserting hole 9. The bar inserting hole 9 has three of the four sides defined by the main body 8a of the locking member 8, and the other side closed by a cover plate 8b (see FIG. 1) fixed to the main body 8a and the insertion portion 10 of the locking member 8 by means of bolts 13. By removing the cover plate 8b from the main body 8a and the insertion portion 10, the bar inserting hole 9 and the cutout groove 14 are exposed to the outside of the locking member 8.

Figure 5:
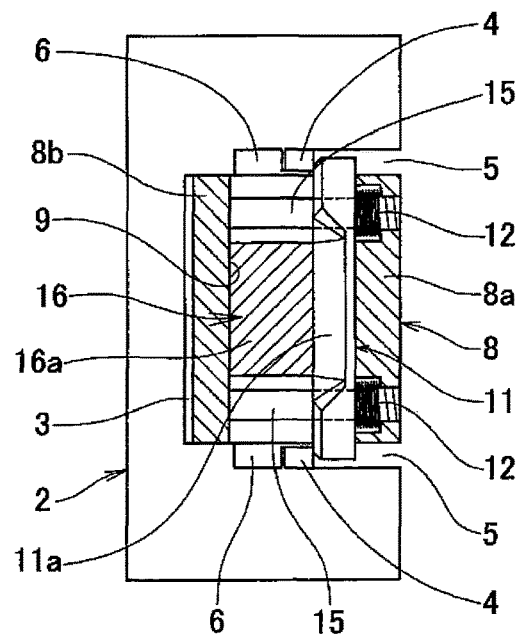
FIG. 5 is a sectional view illustrating a first state in which the thick-walled portion of a locking bar is located between the engagement element and the inner surface of a bar inserting hole.
Figure 6:
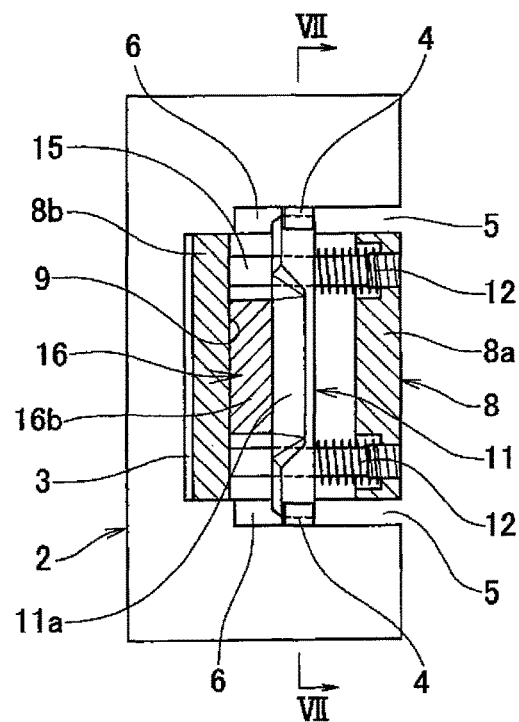
FIG. 6 is a sectional view illustrating a second state in which the thin-walled portion of the locking bar is located between the engagement element and the inner surface of the bar inserting hole.

As illustrated in FIG. 5, the engagement element 11 is mounted to the insertion portion 10 so as to cross the bar inserting hole 9 and to be movable in the thickness direction of the locking bar 16.

The engagement element 11 is an elongated plate having circular arc-shaped ends, and mounted to the insertion portion 10 with the circular arc-shaped ends protruding out of the insertion portion 10 beyond the cutout groove 14 so as to be engageable in the respective engagement recesses 7 as illustrated in FIG. 7.

Figure 3:
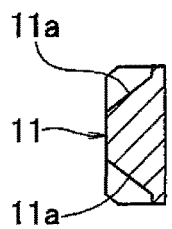
FIG. 3 is a sectional view of an engagement element taken along line III-III of FIG. 2.

As illustrated in FIG. 3, the shown engagement element 11 includes cam surfaces 11a provided, respectively, on the upper and lower end corners of one surface of the engagement element 11 in the thickness direction thereof such that, when each cam surface 11a is pushed by the locking bar 16, a component force in the thickness direction of the locking bar 16 is generated by the contact of the locking bar 16 with the cam surface 11a.

The springs 12 push the engagement element 11 toward the second engagement element paths 6. It is preferable that as illustrated in FIGS. 1 and 5, guide shafts 15 are mounted to the interior of the insertion portion 10 of the locking member 8, and the springs 12 are mounted around the outer peripheries of the respective guide shafts 15. However, the guide shafts 15 are not essential elements.

While, as in this embodiment, it is preferable that two springs 12 are mounted to both sides of the engagement element 11 so as to uniformly apply biasing forces to the respective portions of the engagement element 11 to which the two springs are mounted, only a single spring 12 may be used to bias the engagement element 11.

The locking bar 16 includes a thick-walled portion 16a having a predetermined length and including the front end of the locking bar 16, with the remaining portion thereof, i.e., its portion including the rear end of the locking bar 16 constituting a thin-walled portion 16b having a predetermined length and smaller in wall thickness than the thick-walled portion 16a. The wall thickness of the thick-walled portion 16a is equal to or larger than the sum of the width of the first engagement element path 5 and the width of each engagement rib 4.

The shown locking bar 16 includes cam surfaces 16c and 16d provided, respectively, at the front and rear ends of the thick-walled portion 16a so as to push and move the engagement element 11. The rear end of the thick-walled portion 16a is connected to the thin-walled portion 16b through the cam surface 16d.

The cam surfaces 16c and 16d slope in opposite directions to each other. When the locking bar 16 is inserted into the bar inserting hole 9, the cam surface 16c pushes and moves the engagement element 11 toward the first engagement element paths 5.

When the locking bar 16 is moved in the pullout direction (direction in which the locking bar 16 is pulled out of the bar inserting hole 9) from the position where the thick-walled portion 16b is inserted and located between the engagement element 11 and the inner surface of the bar inserting hole 9, the cam surface 16d pushes and moves the engagement element 11 toward the first engagement element paths 5.

The shown parting locking device 1 having such a structure is configured such that with the insertion portion 10 of the locking member 8 inserted in the vertically penetrating portion 3 of the base holder 2, the locking bar 16 is inserted into the bar inserting hole 9 of the locking member 8.

When the locking bar 16 is pushed into the bar inserting hole 9 to a second state (FIG. 6) in which the thin-walled portion 16b of the locking bar 16 is located between the engagement element 11 and the inner surface of the bar inserting hole 9, the engagement element 11 is pushed by the springs 12, and moved to the positions of the engagement protrusions 4, so that as illustrated in FIG. 7, both ends of the engagement element 11 are fitted/engaged in the respective engagement recesses 7, thereby keeping the locking member 8 coupled to the base holder 2.

When the locking bar 16 is moved in the pullout direction to a first state (FIG. 5) in which the thick-walled portion 16a is moved and located between the engagement element 11 and the inner surface of the bar inserting hole 9, the engagement element 11 is moved into the first engagement element paths 5 while compressing the springs 12, and thus disengaged from the engagement protrusions 4, thereby uncoupling the locking member 8 from the base holder 2.

When the locking bar 16 is further pulled in the pullout direction to a third state (FIG. 8) in which the locking bar 16 is completely pulled out of the bar inserting hole 9, the engagement element 11 is pushed by the springs 12, and moved into the second engagement element paths 6 so as to be disengaged from the engagement protrusions 4, thereby uncoupling the locking member 8 from the base holder 2, as in the first state.

Figure 10:
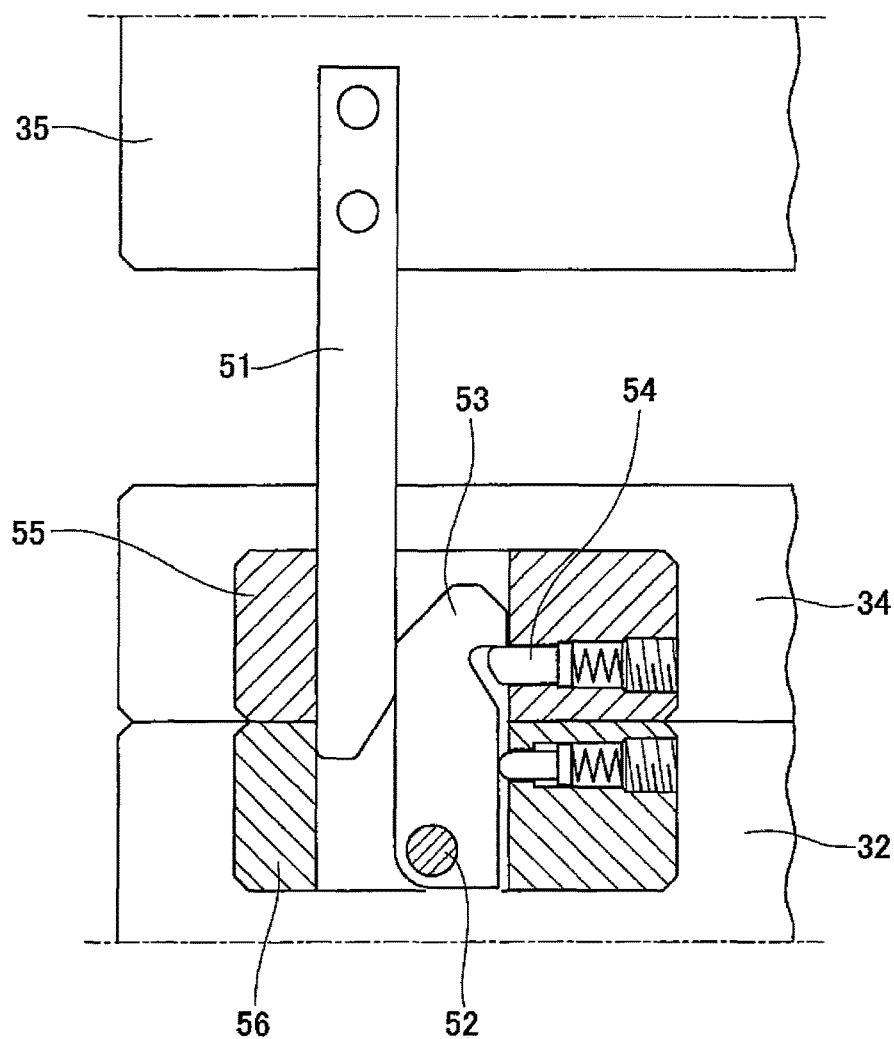
FIG. 10 is a sectional view of a conventional parting locking device.

Since, as described above, the locking member 8 can be uncoupled form the base holder 2 even with the thick-walled portion 16a of the locking bar 16 inserted in the bar inserting hole 9, the movement stroke of the locking bar 16 of the device 1 necessary for uncoupling the locking member 8 is small compared to the device illustrated in FIG. 10.

Also, while engaged in the engagement recesses 7, the engagement element 11 is displaced in nether of the depth directions of the engagement recess 7. Therefore, when the locking bar 16 is moved in the pullout direction, it is possible to reliably disengage the engagement element 11 from the engagement recesses 7, and thus to uncouple the locking member 8 from the base holder 2 with no problem.

Figure 9:
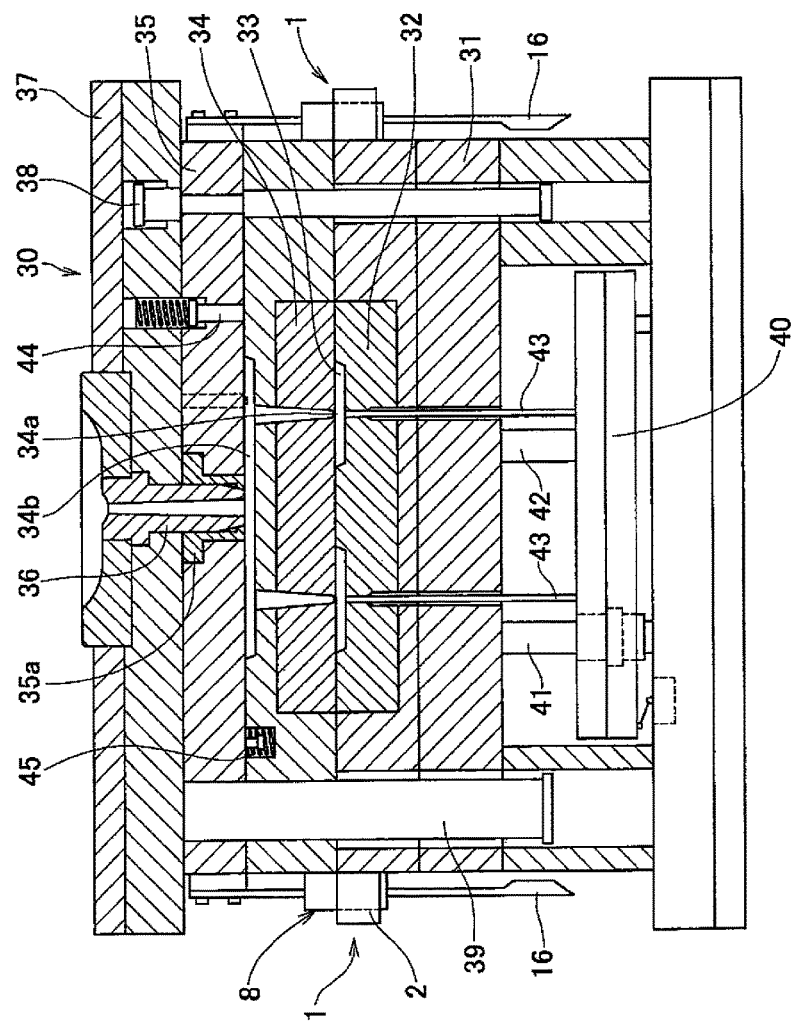
FIG. 9 is a sectional view of an injection molding mold assembly embodying the present invention.

FIG. 9 exemplifies an injection molding mold assembly 30 which is used in an injection molding machine, and in which locking devices 1 as described above are used.

The shown injection molding mold assembly 30 includes a fixed mold 32 supported by a fixed plate 31; a movable mold 34 defining, between the fixed mold 32 and the movable mold 34, cavities 33 for molding molten resin into a predetermined shape; a stripper plate 35 including a spool bush guide 35a, and configured to be brought into contact with and separated from the movable mold 34; and a spool bush 36 configured to be inserted into the spool bush guide 35a of the stripper plate 35 when molten resin is supplied into the mold assembly 30.

The injection molding mold assembly 30 further includes a spool plate 37 to which the spool bush 36 is mounted; a pulling pin 38; a support pin 39 configured such that after the spool plate 37 moves by a predetermined distance, the support pin 39 transmits the movement of the spool plate 37 to the movable mold 34, thereby pulling and moving the movable plate 34; an ejector plate 40 arranged under the fixed plate 31; a guide pin 41 and a support pillar 42 configured to guide the ejector plate 40; ejector pins 43 mounted to the ejector plate 40; and a pusher pin 44 and a coil spring 45 configured to separate the stripper plate 35 from the movable plate 34.

The pulling pin 38 is fixed to the stripper plate 35, and configured to allow the stripper plate 35 to move together with the spool plate 37 after the spool plate 37 moves slightly away from the stripper plate 35.

Though not illustrated, the injection molding mold assembly 30 further includes a temperature sensor, a switch for operation check, and a cavity degassing portion.

The movable mold 34 is provided with gates 34a (or a single gate if there is only one cavity) constituting entrances to the cavities 33; and a flow path 34b by which molten resin supplied through the spool bush 36 is distributed to the respective gates 34a (or guided to the single gate).

The parting locking devices 1 are mounted to the respective sides of the injection molding mold assembly 30. By mounting the parting locking devices 1 in this way, it is possible to move the stripper plate 35 and the movable mold 34 in a smooth manner.

Specifically, the parting locking devices 1 are mounted to the injection molding mold 30 such that the base holders 2 are fixed to the fixed mold 32, the locking members 8 are fixed to the movable mold 34, and the locking bars 16 are mounted to the stripper plate 35. However, the arrangements of the base holders 2 and the locking members 8 in FIG. 9 may be inverted.

Namely, even when the parting locking devices 1 are mounted to the injection molding mold assembly 30 such that the locking members 8 are fixed to the fixed mold 32, and the base holders 2 are fixed to the movable mold 34, the parting locking devices 1 can function in an appropriate manner.

The shown injection molding mold 30 assembly is configured such that as illustrated in FIG. 9, with the movable mold 34 and the stripper plate 35 in abutment with the fixed mold 32 and the movable mold 34, respectively, and further with the spool bush 36 inserted in the spool bush guide 35a, molten resin is supplied to the cavities 33.

Thereafter, when the spool plate 37 is moved, the stripper plate 35 begins to move together with the spool plate 37 slightly after the spool plate 37 begins to move, so that a runner portion constituted by the resin remaining in the flow path 34b is separated from the products in the cavities.

Thereafter, when the spool plate 37 further moves, the fixed mold 32 and the movable mold 34 are uncoupled from each other by the parting locking devices 1. In this state, the support pin 39 pulls and moves the movable mold 34 such that the cavities 33 are exposed, and the ejector pin 43 ejects/pushes the products out of the cavities 33.

In the above embodiment, the parting locking devices are used in a three-plate type injection molding machine to allow, when opening the cavities, the stripper plate to be separated from the movable mold before the movable mold is separated from the fixed mold, but may be used in a two-plate type injection molding machine to keep the movable mold in abutment with the fixed mold for a predetermined time.

It is possible to reliably keep the movable mold coupled to the fixed mold until the locking bars move to uncoupling/disengaging positions, by fixing the base holders to the fixed mold with the locking members fixed to the movable mold, or fixing the locking members to the fixed mold with the base holders fixed to the movable mold; and further by including, in the mold assembly injection molding machine, a component configured to move, when opening the cavities, in the separation direction of the movable mold (direction in which the movable mold is separated from the fixed mold) before the movable mold is separated from the fixed mold, and mounting the locking bars to this component.

DESCRIPTION OF REFERENCE NUMERALS

1: parting locking device
2: base holder
3: vertically penetrating portion
4: engagement rib
5: first engagement element path
6: second engagement element path
7: engagement recess
8: locking member
8a: main body
8b: cover plate
9: bar inserting hole
10: insertion portion
11: engagement element
11a: cam surface
12: spring
13: bolt
14: cutout groove
15: guide shaft
16: locking bar
16a: thick-walled portion
16b: thin-walled portion
16c, 16d: cam surface
30: injection molding mold assembly
31: fixed plate
32: fixed mold
33: cavity
34: movable mold
34a: gate
34b: flow path
35: stripper plate
35a: spool bush guide
36: spool bush
37: spool plate
38: pulling pin
39: support pin
40: ejector plate
41: guide pin
42: support pillar
43: ejector pin
44: pusher pin
45: coil spring

The invention claimed is:

1. A parting locking device comprising:
a base holder;
a locking member including a bar inserting hole vertically extending through the locking member; and
a locking bar configured to be inserted into and pulled out of the bar inserting hole,
wherein the base holder comprises:
a vertically penetrating portion having two side surfaces;
engagement ribs provided on the two side surfaces of the vertically penetrating portion so as to be opposed to each other, the engagement ribs including engagement recesses provided in respective longitudinal midway portions of the engagement ribs so as to be opposed to each other; and
first engagement element paths and second engagement element paths arranged such that the engagement ribs are located between the first engagement element paths and the respective second engagement element paths,
wherein the locking member comprises:
an insertion portion configured to be inserted into and pulled out of the vertically penetrating portion of the base holder;
an engagement element having two ends, the engagement element being mounted to the bar inserting hole such that the engagement element is movable in a thickness direction of the locking bar, and such that the two ends of the engagement element protrude out of the insertion portion so as to be engageable in the respective engagement recesses; and
a spring configured to bias the engagement element,
wherein the locking bar comprises a thick-walled portion and a thin-walled portion that are arranged in a longitudinal direction of the locking bar,
wherein the parting locking device is configured to create:
a first state in which the thick-walled portion is located between the engagement element and an inner surface of the bar inserting hole;
a second state in which the thin-walled portion is located between the engagement element and the inner surface of the bar inserting hole; and
a third state in which the locking bar is pulled out of the locking member,
wherein the first state, the second state, and the third state are configured to be selectively switched according to how much the locking bar is inserted in the bar inserting hole,
wherein, in the second state, the engagement element is pushed by the spring, and is moved to an engaged position in which the engagement element is engaged in the engagement recesses, thereby keeping the locking member coupled to the base holder,
wherein, in the first state, the engagement element is moved into the first engagement element paths while compressing the spring, thereby uncoupling the locking member from the base holder, and
wherein, in the third state, the engagement element is pushed by the spring, and moved into the second engagement element paths, thereby uncoupling the locking member from the base holder.

2. The parting locking device according to claim 1, wherein the locking bar further comprises cam surfaces provided, respectively, at front and rear ends of the thick-walled portion so as to push and move the engagement element in the thickness direction of the locking bar, and
wherein the engagement element comprises cam surfaces provided, respectively, on upper and lower end corners of one surface of the engagement element in a thickness direction of the engagement element such that, when each of the cam surfaces of the engagement element is pushed by the locking bar, a component force in the thickness direction of the locking bar is generated by contact of one of the cam surfaces of the locking bar with the cam surface of the engagement element.

3. The parting locking device according to claim 1, wherein the locking member further comprises a guide shaft in an interior of the locking member, and the spring comprises a coil spring mounted around an outer periphery of the guide shaft.

4. An injection molding mold assembly for molding resin, the injection molding mold assembly comprising:
a fixed mold and a movable mold defining, between the fixed mold and the movable mold, a cavity for molding resin; and
a stripper plate configured to be brought into contact with and separated from the movable mold,
wherein the injection molding mold assembly is configured such that, when opening the cavity, the stripper plate is separated from the movable mold before the movable mold is separated from the fixed mold, and
wherein the parting locking device according to claim 1 is mounted to each of two sides of the injection molding mold assembly such that a first one of the base holder and the locking member of the parting locking device is fixed to the fixed mold, a second one of the base holder and the locking member of the parting locking device is fixed to the movable mold, and the locking bar of the parting locking device is mounted to the stripper plate.

5. The parting locking device according to claim 2, wherein the locking member further comprises a guide shaft in an interior of the locking member, and the spring comprises a coil spring mounted around an outer periphery of the guide shaft.

6. An injection molding mold assembly for molding resin, the injection molding mold assembly comprising:
a fixed mold and a movable mold defining, between the fixed mold and the movable mold, a cavity for molding resin; and
a stripper plate configured to be brought into contact with and separated from the movable mold,
wherein the injection molding mold assembly is configured such that, when opening the cavity, the stripper plate is separated from the movable mold before the movable mold is separated from the fixed mold, and
wherein the parting locking device according to claim 2 is mounted to each of two sides of the injection molding mold assembly such that a first one of the base holder and the locking member of the parting locking device is fixed to the fixed mold, a second one of the base holder and the locking member of the parting locking device is fixed to the movable mold, and the locking bar of the parting locking device is mounted to the stripper plate.

7. An injection molding mold assembly for molding resin, the injection molding mold assembly comprising:
a fixed mold and a movable mold defining, between the fixed mold and the movable mold, a cavity for molding resin; and
a stripper plate configured to be brought into contact with and separated from the movable mold,
wherein the injection molding mold assembly is configured such that, when opening the cavity, the stripper plate is separated from the movable mold before the movable mold is separated from the fixed mold, and
wherein the parting locking device according to claim 3 is mounted to each of two sides of the injection molding mold assembly such that a first one of the base holder and the locking member of the parting locking device is fixed to the fixed mold, a second one of the base holder and the locking member of the parting locking device is fixed to the movable mold, and the locking bar of the parting locking device is mounted to the stripper plate.

8. An injection molding mold assembly for molding resin, the injection molding mold assembly comprising:
a fixed mold and a movable mold defining, between the fixed mold and the movable mold, a cavity for molding resin; and
a stripper plate configured to be brought into contact with and separated from the movable mold,
wherein the injection molding mold assembly is configured such that, when opening the cavity, the stripper plate is separated from the movable mold before the movable mold is separated from the fixed mold, and
wherein the parting locking device according to claim 5 is mounted to each of two sides of the injection molding mold assembly such that a first one of the base holder and the locking member of the parting locking device is fixed to the fixed mold, a second one of the base holder and the locking member of the parting locking device is fixed to the movable mold, and the locking bar of the parting locking device is mounted to the stripper plate.

* * * * *